United States Patent
Karri et al.

(10) Patent No.: US 11,573,770 B2
(45) Date of Patent: Feb. 7, 2023

(54) CONTAINER FILE CREATION BASED ON CLASSIFIED NON-FUNCTIONAL REQUIREMENTS

(71) Applicant: International Business Machines Corporation, Armonk, NY (US)

(72) Inventors: Venkata Vara Prasad Karri, Visakhapatnam (IN); Saraswathi Sailaja Perumalla, Visakhapatnam (IN); Sarbajit K. Rakshit, Kolkata (IN); Pavan K Manda, Vishakapatnam (IN)

(73) Assignee: International Business Machines Corporation, Armonk, NY (US)

( * ) Notice: Subject to any disclaimer, the term of this patent is extended or adjusted under 35 U.S.C. 154(b) by 15 days.

(21) Appl. No.: 17/308,123

(22) Filed: May 5, 2021

(65) Prior Publication Data

US 2022/0357930 A1 Nov. 10, 2022

(51) Int. Cl.
*G06F 8/30* (2018.01)
*G06N 20/00* (2019.01)
(Continued)

(52) U.S. Cl.
CPC .............. *G06F 8/30* (2013.01); *G06F 8/10* (2013.01); *G06F 8/75* (2013.01); *G06N 5/04* (2013.01); *G06N 20/00* (2019.01)

(58) Field of Classification Search
CPC .... G06F 8/30; G06F 8/10; G06F 8/75; G06N 5/04; G06N 20/00
(Continued)

(56) References Cited

U.S. PATENT DOCUMENTS 8,055,622 B1 * 11/2011 Botes .................... G06F 16/185
707/661
8,775,392 B1 * 7/2014 Walker ................ G06F 16/1734
707/695
(Continued)

FOREIGN PATENT DOCUMENTS

WO WO-2015145992 A1 * 10/2015 ............... G06F 9/44

OTHER PUBLICATIONS

Lewis, Seth C., Rodrigo Zamith, and Alfred Hermida. "Content analysis in an era of big data: A hybrid approach to computational and manual methods." Journal of broadcasting & electronic media 57.1 (2013): pp. 34-52. (Year: 2013).*
(Continued)

*Primary Examiner* — Satish Rampuria
(74) *Attorney, Agent, or Firm* — Daniel M. Yeates

(57) ABSTRACT

A computer-implemented method classifies and creates a container file based on non-functional parameters. The method includes analyzing, by a learning model, a codebase. The codebase includes code for one or more applications. The method also includes identifying, based on the analyzing, a set of functional requirements for each application and a set of non-functional parameters. The method further includes classifying a first application of the one or more applications with a first non-functional parameter. The method includes generating a first container file for the first application. The first container file includes the functional requirements for the first application and the first non-functional parameter. The method further includes creating a first container from the first container file.

17 Claims, 5 Drawing Sheets

(51) Int. Cl.
*G06F 8/10* (2018.01)
*G06F 8/75* (2018.01)
*G06N 5/04* (2006.01)

(58) Field of Classification Search
USPC .................................................. 717/100–135
See application file for complete search history.

(56) References Cited

U.S. PATENT DOCUMENTS

| | | | | |
|---|---|---|---|---|
| 2005/0060722 | A1* | 3/2005 | Rochette | G06F 8/60 719/319 |
| 2011/0185063 | A1* | 7/2011 | Head | G06F 9/5077 718/104 |
| 2016/0350081 | A1* | 12/2016 | Kumar | G06F 8/30 |
| 2018/0089068 | A1 | 3/2018 | Bhojan | |
| 2018/0300478 | A1 | 10/2018 | Brech et al. | |
| 2019/0243972 | A1* | 8/2019 | Krylov | G06F 21/561 |
| 2019/0279114 | A1* | 9/2019 | Deshpande | G06N 20/00 |
| 2019/0310935 | A1* | 10/2019 | Shuster | G06N 5/003 |

OTHER PUBLICATIONS

Jazayeri, Mehdi. "Some trends in web application development." Future of Software Engineering (FOSE'07). IEEE, 2007.pp. 1-16 (Year: 2007).*

Haynes, Brandon, Alvin Cheung, and Magdalena Balazinska. "PipeGen: Data pipe generator for hybrid analytics." Proceedings of the Seventh ACM Symposium on Cloud Computing. 2016.pp. 470-483 (Year: 2016).*

Adams, Bram, et al. "Design recovery and maintenance of build systems." 2007 IEEE International Conference on Software Maintenance. IEEE, 2007.pp. 114-123 (Year: 2007).*

Boukadi, Khouloud, et al. "Container description ontology for CaaS." International Journal of Web and Grid Services 16.4 (2020): pp. 341-363. (Year: 2020).*

Stefanië, Polona, et al. "Non-functional requirements optimisation for multi-tier cloud applications: An early warning system case study." 2017 IEEE SmartWorld, IEEE, 2017.pp. 1-9 (Year: 2017).*

Castellanos, "Building Docker Images with Dockerfiles", Docker Tutorials, Published Date: Jun. 30, 2019, Code Fresh, 17 pages.

Siddiqui et al., "Non-Functional Characteristics and NFT Testing of Container Applications", International Journal of Engineering Research & Technology (IJERT), vol. 9, Issue 07, Published Date: Jul. 2020, 4 pages.

Stefanie et al., "Non-Functional Requirements Optimisation for Multi-Tier Cloud Applications: An Early Warning System Case Study", Research Gate, Published Date: Aug. 6, 2017, Conference Paper, 9 pages.

Philipp Naderer-Puiu, "Non-functional Testing in Cloud Environments", at the Vienna University of Technology, Vienna, Mar. 22, 2016, 105 pages.

Singh, "How to build application inside and outside Docker. Dockerfile structure and commands.", Oct. 8, 2018, 12 pages. https://medium.com/@saurabh.singh0829/how-to-build-application-inside-and-outsidedocker-dockerfile-structure-and-commands-f542b58cd830.

"Non-functional requirement", Wikipedia, printed Feb. 12, 2021, 4 pages. https://en.wikipedia.org/wiki/Non-functional_requirement.

Nonfunctional Requirement—Scaled Agile Framework, Updated Feb. 10, 2021, 3 pages, Website. https://www.scaledagileframework.com/nonfunctional-requirements/.

"Code Analysis Tools", Cast, printed Feb. 12, 2021, Website, 7 pages. https://www.castsoftware.com/products/code-analysis-tools.

Coverity Scan, Static Analysis, Coverity Upgrade to Sep. 2020, Website, Synopsys, printed Feb. 12, 2021, 5 pages. https://scan.coverity.com/.

Well et al., "The NIST Definition of Cloud Computing", Recommendations of the National Institute of Standards and Technology, Special Publication 800-145, Sep. 2011, 7 pages.

* cited by examiner

CONTAINER FILE CREATION BASED ON CLASSIFIED NON-FUNCTIONAL REQUIREMENTS

BACKGROUND

The present disclosure relates to cloud computing, and, more specifically, to container file creation based on non-functional parameters.

A container is a standard unit of software that packages up code and all its dependencies, so the application runs quickly and reliably from one computing environment to another. A container image is a lightweight, standalone, executable package of software that includes everything needed to run an application, include code, runtime, system tools, system libraries and settings.

SUMMARY

Disclosed is a computer-implemented method to classify and create a container file based on non-functional parameters. The method includes analyzing, by a learning model, a codebase, wherein the codebase includes code for one or more applications. The method also includes identifying, based on the analyzing, a set of functional requirements for each application and a set of non-functional parameters. The method further includes classifying a first application of the one or more applications with a first non-functional parameter from the set of non-functional parameters. The method includes generating a first container file for the first application, wherein the first container file includes the functional requirements for the first application and the first non-functional parameter. The method further includes creating a first container from the first container file. Further aspects of the present disclosure are directed to systems and computer program products containing functionality consistent with the method described above.

The present Summary is not intended to illustrate each aspect, every implementation, and/or every embodiment of the present disclosure.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

DETAILED DESCRIPTION

Cloud Computing in General

Figure 1:
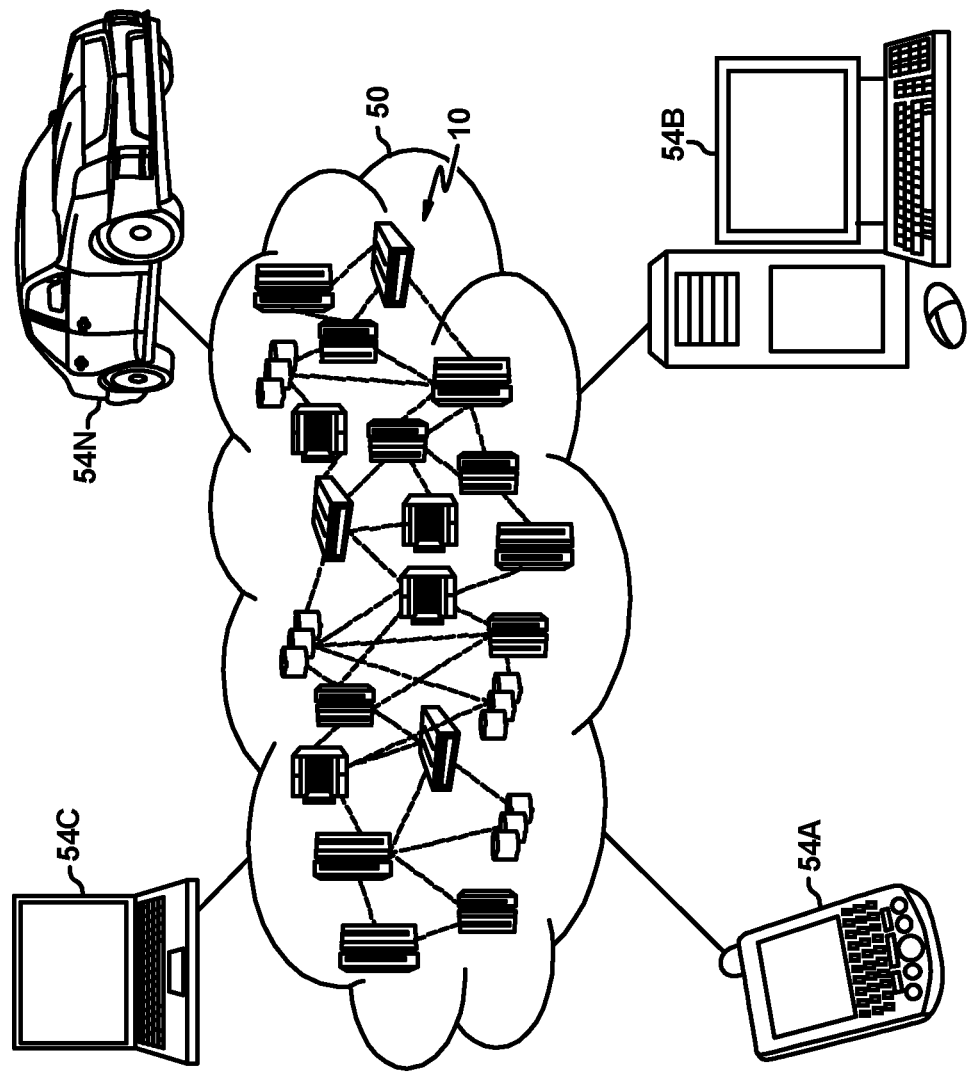
FIG. 1 depicts a cloud computing environment according to an embodiment of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and personal digital assistants (PDAs)).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
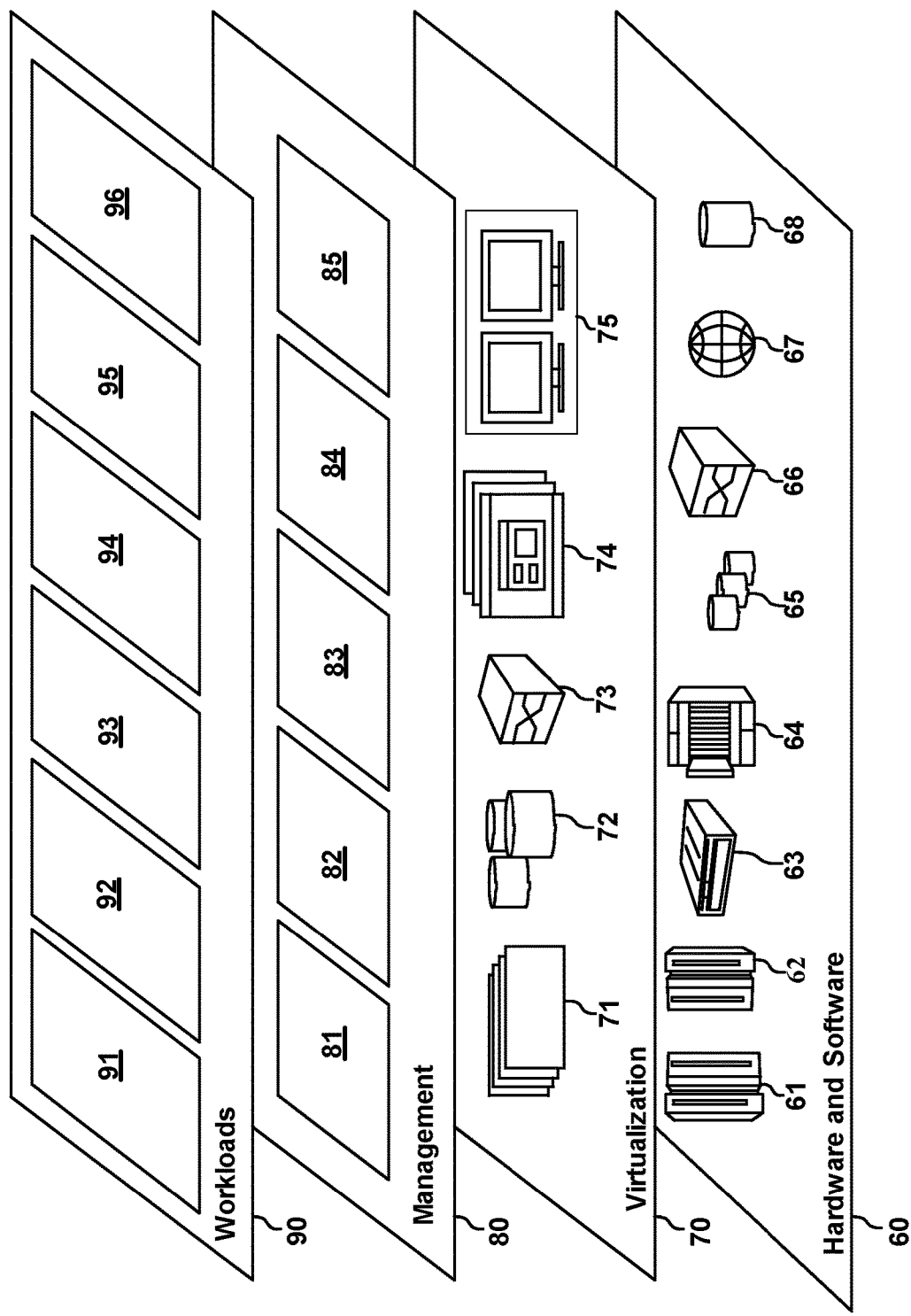
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and classifying non-functional requirements in a codebase 96.

Data Processing System in General

Figure 3:
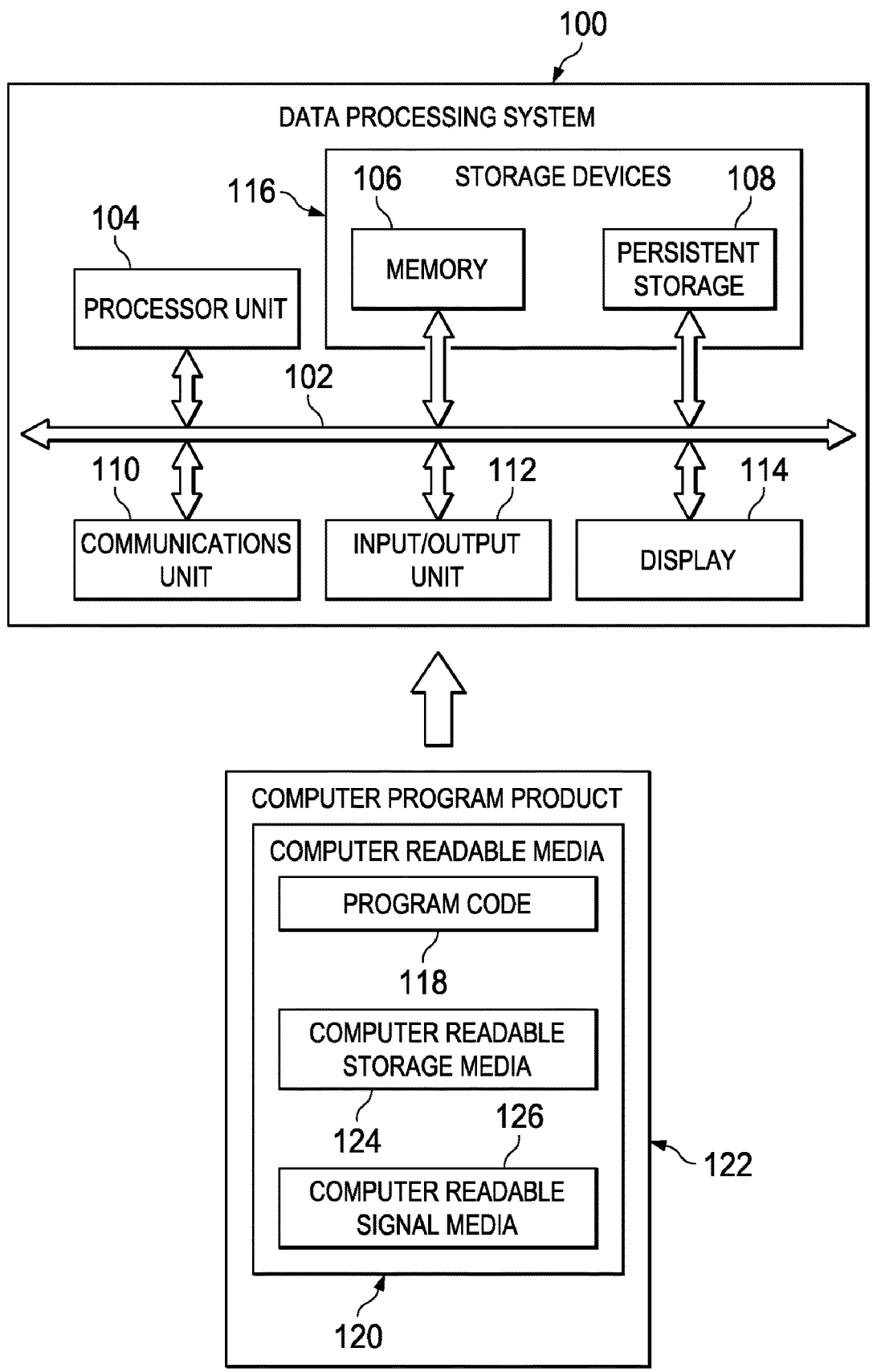
FIG. 3 is a block diagram of a DPS according to one or more embodiments disclosed herein.

FIG. 3 is a block diagram of an example data processing system (DPS) according to one or more embodiments. The DPS may be used as a cloud computing node 10. In this illustrative example, the DPS 100 may include communications bus 102, which may provide communications between a processor unit 104, a memory 106, persistent storage 108, a communications unit 110, an Input/Output (I/O) unit 112, and a display 114.

The processor unit 104 serves to execute instructions for software that may be loaded into the memory 106. The processor unit 104 may be a number of processors, a multi-core processor, or some other type of processor, depending on the particular implementation. A number, as used herein with reference to an item, means one or more items. Further, the processor unit 104 may be implemented using a number of heterogeneous processor systems in which a main processor is present with secondary processors on a single chip. As another illustrative example, the processor unit 104 may be a symmetric multi-processor system containing multiple processors of the same type.

The memory 106 and persistent storage 108 are examples of storage devices 116. A storage device may be any piece of hardware that is capable of storing information, such as, for example without limitation, data, program code in functional form, and/or other suitable information either on a temporary basis and/or a permanent basis. The memory 106, in these examples, may be, for example, a random access memory or any other suitable volatile or non-volatile storage device. The persistent storage 108 may take various forms depending on the particular implementation.

For example, the persistent storage 108 may contain one or more components or devices. For example, the persistent storage 108 may be a hard drive, a flash memory, a rewritable optical disk, a rewritable magnetic tape, or some combination of the above. The media used by the persistent storage 108 also may be removable. For example, a removable hard drive may be used for the persistent storage 108.

The communications unit 110 in these examples may provide for communications with other DPSs or devices. In these examples, the communications unit 110 is a network interface card. The communications unit 110 may provide communications through the use of either or both physical and wireless communications links.

The input/output unit 112 may allow for input and output of data with other devices that may be connected to the DPS 100. For example, the input/output unit 112 may provide a connection for user input through a keyboard, a mouse, and/or some other suitable input device. Further, the input/output unit 112 may send output to a printer. The display 114 may provide a mechanism to display information to a user.

Instructions for the operating system, applications and/or programs may be located in the storage devices 116, which are in communication with the processor unit 104 through the communications bus 102. In these illustrative examples, the instructions are in a functional form on the persistent storage 108. These instructions may be loaded into the memory 106 for execution by the processor unit 104. The processes of the different embodiments may be performed by the processor unit 104 using computer implemented instructions, which may be located in a memory, such as the memory 106.

These instructions are referred to as program code, computer usable program code, or computer readable program code that may be read and executed by a processor in the processor unit 104. The program code in the different embodiments may be embodied on different physical or tangible computer readable media, such as the memory 106 or the persistent storage 108.

The program code 118 may be located in a functional form on the computer readable media 120 that is selectively removable and may be loaded onto or transferred to the DPS 100 for execution by the processor unit 104. The program code 118 and computer readable media 120 may form a computer program product 122 in these examples. In one example, the computer readable media 120 may be computer readable storage media 124 or computer readable signal media 126. Computer readable storage media 124 may include, for example, an optical or magnetic disk that is inserted or placed into a drive or other device that is part of the persistent storage 108 for transfer onto a storage device, such as a hard drive, that is part of the persistent storage 108. The computer readable storage media 124 also may take the form of a persistent storage, such as a hard drive, a thumb drive, or a flash memory, that is connected to the DPS 100. In some instances, the computer readable storage media 124 may not be removable from the DPS 100.

Alternatively, the program code 118 may be transferred to the DPS 100 using the computer readable signal media 126. The computer readable signal media 126 may be, for example, a propagated data signal containing the program code 118. For example, the computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 118 may be downloaded over a network to the persistent storage 108 from another device or DPS through the computer readable signal media 126 for use within the DPS 100. For instance, program code stored in a computer readable storage medium in a server DPS may be downloaded over a network from the server to the DPS 100. The DPS providing the program code 118 may be a server computer, a client computer, or some other device capable of storing and transmitting the program code 118.

The different components illustrated for the DPS 100 are not meant to provide architectural limitations to the manner in which different embodiments may be implemented. The different illustrative embodiments may be implemented in a DPS including components in addition to or in place of those illustrated for the DPS 100. Other components shown in FIG. 1

The present disclosure relates to cloud computing, and, more specifically, to container file creation based on non-functional parameters.

A container is a standard unit of software that packages up code and all its dependencies, so the application runs quickly and reliably from one computing environment to another. A Docker container image is a lightweight, standalone, executable package of software that includes everything needed to run an application, include code, runtime, system tools, system libraries and settings.

Containerized software always runs the same, regardless of the infrastructure. Containers can isolate software from its environment and ensure that the contained applications work uniformly despite differences between development and staging of the container.

Container management software (a container manager) can build container images by reading instructions contained in a text file (e.g., container file, Dockerfile®, etc.). The text files contains all the commands needed to gather and assemble the software that will be used in the container. The container image is generated by executing several command-line instructions in succession. A container image can be sent and/or replicated to run as needed on a remote computing device.

All of the code/commands that are required to complete/perform a specific task, generally associated with the container, are considered functional components of the container. In some embodiments, containers can include extra software/commands that perform functions outside of the associated task. These components/commands can be non-functional/excess commands. Non-Functional requirements (NFR) define system attributes such as security reliability, performance, maintainability, scalability, and usability among others. They can serve as constraints and/or restrictions on the design of the system. Various systems can be configured to support and/or require different types of NFR such as backup, certification modifiability, reusability, response time, and the like. For purposes of this application, the terms non-functional parameters (NFP) and non-functional requirements are used interchangeably.

Applications that are pulled into containers can be stored in a codebase. A container file can call the codebase to pull the code into a container image. A container file is a file (e.g., text file) that contains all of the commands that are used to assemble a container image. A Dockerfile® is one example of a container file.

Embodiments of the present disclosure can use machine learning to analyze and/or classify a codebase of an application to identify relevant non-functional parameters and automatically generate a container file for the classified codebase.

The machine learning system can analyze historical application data, which includes, usage parameters, number of concurrent users, network traffic, application logs, support tickets, and the like. From the analysis, the system can determine one or more tasks the application is designed to complete. The return can include functional and/or non-functional requirements of the application. The machine learning model can be trained by training data. The training data can include a set of containers/container images with one or more NFR included in the container.

Embodiments of the present disclosure will classify the codebase based on the identified functionalities. In some embodiments, a container file generator creates a container file for the application. The container file can be used to create a new container image/container and/or update an existing container image. In some embodiments, a notification can be generated. The notification can include the generated container file and/or a recommendation to implement/update the generated file with the identified functionalities.

Embodiments of the present disclosure of the present disclosure can increase the efficiency of a computing system by limiting/removing unimportant NFR. Removing unnecessary and/or inefficient NFR can decrease the size of the container and/or the time needed to generate, manage, operate, and shift containers around a computing environment. Additionally, the automatic generation of the container file can reduce the time of implementation/updating of a container. The learning model can analyze and recommend changes at a more efficient rate than current methods. Further, the automatic generation of the container file based on NFRs can increase the speed of modernizing non-containerized application to be capable of operating as a container in cloud computing environment.

The aforementioned advantages are example advantages, and embodiments exist that can contain all, some, or none of the aforementioned advantages while remaining within the spirit and scope of the present disclosure.

Figure 4:
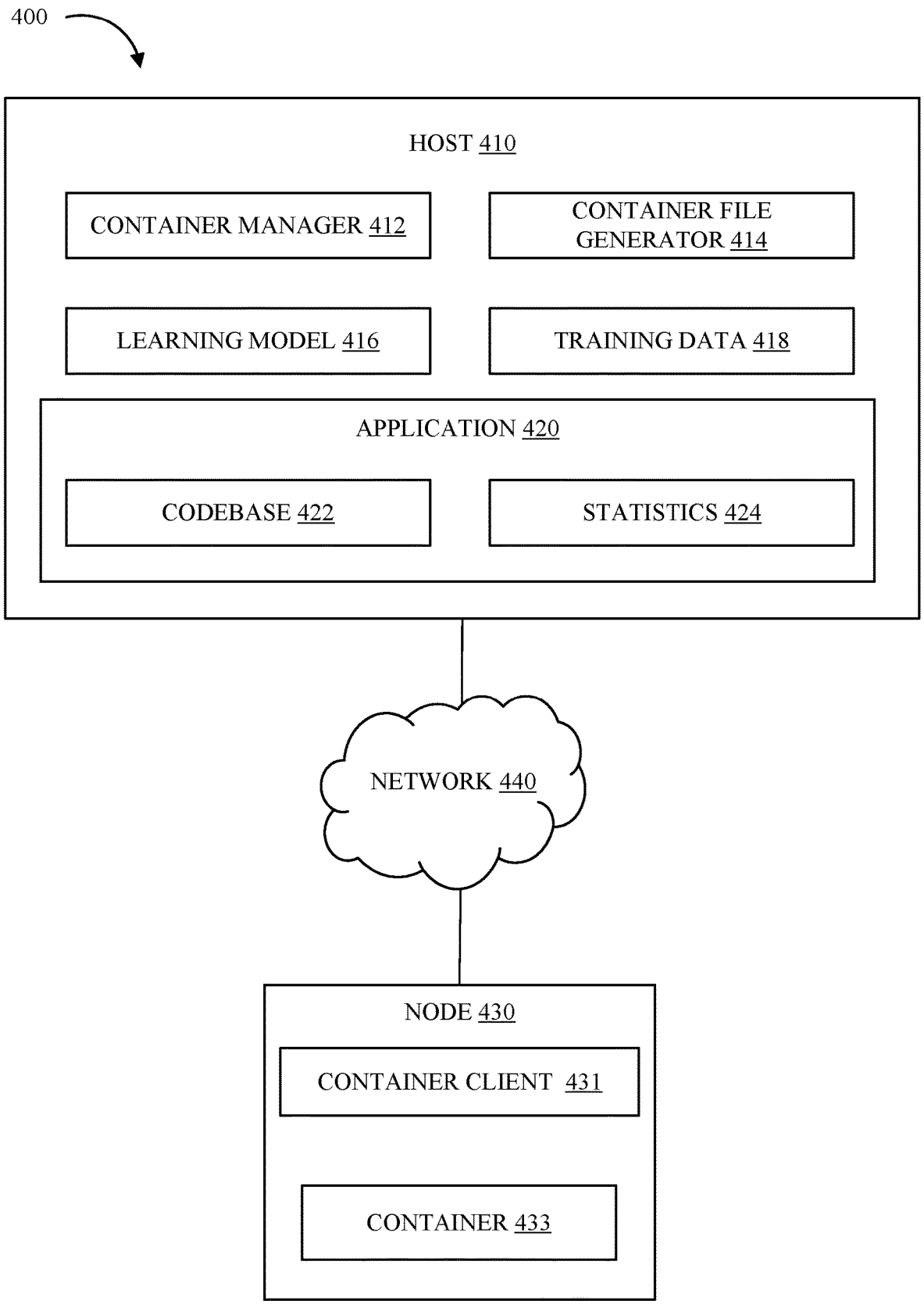
FIG. 4 illustrates a functional diagram of a computing environment suitable for operation of a container manager in accordance with some embodiments of the present disclosure.

Referring now to various embodiments of the disclosure in more detail, FIG. 4 is a representation of a computing environment 400, that is capable of running container manager in accordance with one or more embodiments of the present disclosure. In some embodiments, computing environment 400 can include and/or be included in a cloud computing environment such as cloud computing environment 50, as discussed above. Many modifications to the depicted environment may be made by those skilled in the art without departing from the scope of the disclosure.

Computing environment 400 includes host 410, node 430, and network 440. Network 440 can be, for example, a telecommunications network, a local area network (LAN), a wide area network (WAN), such as the Internet, or a combination of the three, and can include wired, wireless, or fiber optic connections. Network 440 may include one or more wired and/or wireless networks that are capable of receiving and transmitting data, voice, and/or video signals, including multimedia signals that include voice, data, and video information. In general, network 440 may be any combination of connections and protocols that will support communications between host 410, node 430, and other computing devices (not shown) within computing environment 400. In some embodiments, each of host 410 and node 430 may include a computer system, such as the data processing system 100 of FIG. 3.

Host 410 can be a standalone computing device, a management server, a web server, a mobile computing device, or any other electronic device or computing system capable of receiving, sending, and processing data. In other embodiments, host 410 can represent a server computing system utilizing multiple computers as a server system, such as in a cloud computing environment (e.g., cloud computing environment 50). In some embodiments, host 410 includes container manager 412, container file generator 414, learning model 416, training data 418, and application 420.

Container manager 412 can be any combination of hardware and/or software configured to operate the lifecycle of containers (e.g., container 433). In some embodiments, container manager 412 controls and automates tasks including, but not limited to, provisioning and deployment of containers, redundancy and availability of containers, allocation of resources between containers, movement of containers across a host infrastructure, and load balancing between containers and/or nodes 430. In some embodiments, container manager 412 includes a container orchestration system (e.g., Kubernetes®). In some embodiments, one or more of container file generator 414, learning model 416, training data 418, and application 420 are included in container manager 412. They are shown separately for description purposes.

In some embodiments, container manager 412 can generate a container image and/or a container from a container file. The container image can be initiated, sent to a node transferred to a node, closed, and/or any other similar task by container manager 412.

Training data 418 can be a set of data used to train learning model 416. In some embodiments, training data 418 includes data for application have a deployed/deployable container. The container can include one or more NFR. The training data can also include various historical/usage data for the applications contained in the container. The training data can include application codebase, application functionalities, usage statistics, application maintenance, application logs, and/or trouble tickets. The training data can be analyzed to give insights into functional requirements, and NFR. In some embodiments, training data 418 includes container file generated by a user. The user generated container file can provide a blueprint for functionalities of the application that can be associated with NFR.

Learning model 416 can be any combination of hardware and/or software configured identify and/or classify NFR in a codebase. In some embodiments, learning model 416 is trained to identify and/or characterize a codebase. The characterization can be based on analyzing training data 418. In some embodiments, learning model 416 can identify the functional and NFR of a codebase. In some embodiments, the input into the model to be analyzed for a particular codebase/application includes some of all of the types of data that in used for training. In some embodiments, learning model 416 can determine if one or more NFR should be added to a container/container file. For example, the output could be to include a security NFR to keep data that will be used in a more secure manner and/or to comply with a regulation. The determination can be based on one or more of the functional requirements of the codebase. In some embodiments, learning model 416 can determine if one or more NFRs should not be included and/or be removed from a container/codebase. For example, the output can include a recommendation to remove an NFR that is determined to be in excess/does not provide any valuable functions (e.g., adding extra security to unregulated data).

In some embodiments, learning model 416 can identify a set of all NFRs across all of the applications. In some embodiments, learning model 416 can identify a set of all application functionalities across the set of applications.

In some embodiments, learning model 416 may execute machine learning on data from the environment using one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR). In some embodiments, the BBSH may execute machine learning using one or more of the following example techniques: principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), region-based convolution neural networks (RCNN), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

Container file generator 414 can include any combination of hardware and/or software configured to generate a container file. In some embodiments, container file generator 414 automatically/dynamically generates a container file in response to analyzing an application/codebase. In some embodiments, container file generator 414 includes learning model 416 and training data 418.

In some embodiments, container file generator 414 generates a recommendation to update/generate a container file. The recommendation can include a suggestion to add/include at least one NFR and/or to remove at least one NFR that is already included. In some embodiments, container file generator 414 generates container file based on a built-in template. The template (or container file template) can indicate an order to list the commands for the functional requirements and NFRs.

Application 420 can be any combination of hardware and/or software configured to carry out a function on a computing device (e.g., host 410). In some embodiments, application 420 is a web application. In some embodiments, application 420 can be packaged in one or more pods. In some embodiments, application 420 can represent any number of separate applications. The applications can be combined/grouped into one or more pods or containers. In some embodiments, application 420 can initiate the generation of a pod.

In some embodiments, application 420 includes codebase 422, and statistics 424.

Codebase 422 can be a repository for all the code that makes the application run. Codebase 422 can include functional and non-functional code. In some embodiments, the contents of codebase 422 can be included in one or more container.

Statistics 424 (or usage statistics, application statistics) can be data relating to the use/history of application 420. In some embodiments, statistics 424 includes one or more of application functionalities, usage statistics, application maintenance, application logs, and/or trouble tickets. The training data can be analyzed to give insights into functional requirements, NFRs, and the like. Statistics 424, when analyzed and put through learning model 416, can provide insights into functionalities, tasks that can be completed by the application, and relevant/related NFRs.

Node 430 can be any combination of hardware and/or software configured to run one or more pods. In some embodiments, node 430 can be a standalone computing device, a management server, a web server, a mobile computing device, or any other electronic device or computing system capable of receiving, sending, and processing data. In some embodiments, node 430 can represent a server computing system utilizing multiple computers as a server system, such as in a cloud computing environment. In some embodiments, nodes 430 includes container client 431, and container 433.

Container client 431 can be any combination of hardware and/or software configured to run a container on a node. In some embodiments, container client 431 works complementarily with container manager 412. Container client 431 can be a node agent that runs on each node and/or a container runtime agent (e.g., Kubelet® as an agent to Kubernetes®). Container client 431 can interface with container manager 412 to receive and execute containers as instructed by container manager 412. Container client 431 can receive one or more pods from container manager 412.

Container 433 can be any combination of hardware and/or software configured to run an application on a remote node. A container can be a software package that includes the necessary instructions and/or data to perform a specified task. It can include a runtime, all system libraries, and application libraries needed to fully accomplish the task of the application.

In some embodiments, computing environment 400 can include additional nodes that can run one or more containers as managed by container manager 412. Said differently, node 430 can be divided into two or more nodes that are each configured to run at least one container.

Figure 5:
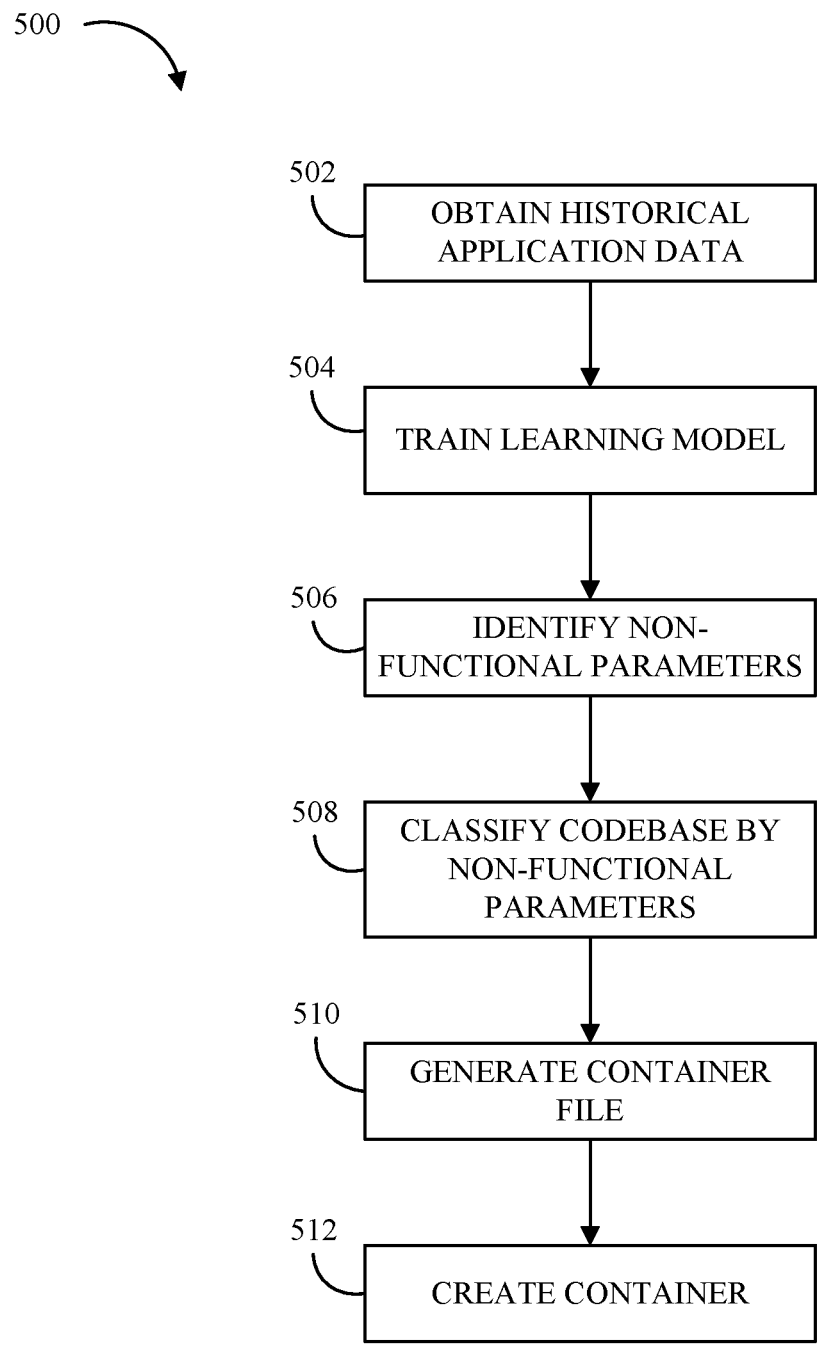
FIG. 5 illustrates a flow chart of an example method to classify an application in a codebase by non-functional parameters, in accordance with some embodiments of the present disclosure.

FIG. 5 depicts a flowchart of an example method, method 500, for classifying applications based on non-functional requirements that can be performed in a computing environment (e.g., computing environment 400 and/or cloud computing environment 50). One or more of the advantages and improvements described above for classifying a codebase and generating a container file based on non-functional requirements may be realized by method 500, consistent with various embodiments of the present disclosure.

Method 500 can be implemented by one or more processors, host 410, container manager 412, container file generator 414, learning model 416, training data 418, application 420 and/or a different combination of hardware and/or software. In various embodiments, the various operations of method 500 are performed by one or more of host 410, container manager 412, container file generator 414, learning model 416, training data 418, and application 420. For illustrative purposes, the method 500 will be described as being performed by container manager 412.

At operation 502, container manager 412 obtains/gathers historical data about a set of applications. In some embodiments, the gathered data can be incorporated into training data 418. In some embodiments, the data can include operational parameters for the system on which the set of applications operate. In some embodiments, the data can include specific parameters for each application. The specific parameters can include usage logs, job processing logs, service tickets, and the like. In some embodiments, the data is obtained from previously generated and/or currently operating container files, container images, and/or containers. Logs and usage history for the deployed containers can also be included in the data, including any data related to NFRs.

At operation 504, container manager 412 trains a learning model. In some embodiments, the learning model is learning model 416. In some embodiments, the learning model can be trained by training data 418. In some embodiments, the learning model is trained by the data gathered in operation 502. The learning model can be trained to identify functional and non-functional requirements of an application.

In some embodiments, the training includes analyzing all the data associated with the set of applications. In some embodiments, each code block of each application is analyzed by the learning model. In some embodiments, code analysis software can be used to identify elements of the code (e.g., functionalities, modules, code blocks, etc.).

At operation 506, container manager 412 identifies one or more non-functional parameters. In some embodiments, each of the NFR's identified in any application can be included in the one or more non-functional parameters.

At operation 508, container manager 412 classifies the applications/codebase based on the NFR's. the classifying includes identifying one or more NFRs that are included with a codebase. In some embodiments, the classifying includes identifying one or more NFR that are not included, but will increase the value of a codebase. For example, assume a first application and a second application are both related to an account based transaction (e.g., login, change password, etc.). The first application can be classified as having an NFR for security features related to the financial transaction. The second application can be classified as not having the same NFR, but noting the NFR is likely to increase the usefulness of the second application. In some embodiments, the classifying can include determining an NFR is included but the NFR is excess. Excess can mean that is adds computing/processing cost but does not add any usefulness to the application and/or the NRF is excessive/duplicate.

At operation 510, container manager 412 generates a container file for at least one application. In some embodiments, the container file is generated by container file generator 414. The generated container file can be based on the classification of operation 508. In some embodiments, the generated container file can include an NFR that was not included in the codebase and/or remove an NFR that was included in the codebase.

In some embodiments, the container file is based on a template. The template can include general instructions/rules for an order and necessary elements of the docker file. In some embodiments, each container file includes the functional requirements for the application.

In some embodiments, operation 510 can include generating a recommendation to alter/update a container file. The container file can be a previously generated and/or be associated with a deployed container/container image. In some embodiments, the recommendation is issued in place of generating a new container file. In some embodiments, a new container file is generated and a recommendation is generated. In some embodiments, for a previously generated container file/container, the docker file is regenerated and the regenerated container file includes/excludes the recommended non-functional parameters. In some embodiments, for a previously generated container file, the recommendation can include adding a new non-functional parameter (NFR?) to the container file, where "new" means not previously included.

At operation 512, container manager 412 creates the container image and/or deploys the container. The container can be generated based on the container image. In some embodiments, the deployed container can be based on the NFR.

The method 500 can reduce the amount of time to modernize applications. Container manager 412 can identify, from a large codebase that can include many applications (e.g., an organizations entire codebase), the relevant/important NFRs and apply those relevant applications as they are moved into containers to be utilized in cloud computing environments.

Computer Technology and Computer Readable Media

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    training a learning model with a set of training data, wherein the training data includes an application codebase, associated application functionalities, application usage statistics, application maintenance, application logs, and application trouble tickets, wherein the training is configured train the learning model to associate relevant non-relevant parameters to an application functionality;
    analyzing, by the learning model, a codebase, wherein the codebase includes code for one or more applications;
    automatically identifying, by the learning model and based on the analyzing, a set of functional requirements for each application and a set of non-functional requirements (NFR), wherein each requirement of the set of functional requirements is required to complete a task associated with each application, and the set of NFR's perform functions outside of the task;

classifying a first application of the one or more applications with a first NFR from the set of NFRs;
generating a recommendation to include the first NFR in a first container file for the first application;
automatically generating, by the learning model and based on the recommendation, the first container file for the first application, wherein the first container file includes the functional requirements for the first application and the first NFR; and
creating a first container from the first container file.

2. The method of claim 1, wherein the first NFR is associated with a second application in the codebase.

3. The method of claim 1, wherein the first application is associated with a second NFR in the codebase and, based on the recommendation, the second NFR is not included in the first container file.

4. The method of claim 1, further comprising:
identifying, based on the analyzing, the task that is accomplished by each application in the codebase.

5. The method of claim 1 further comprising:
determining in a first determination, for a second container file that is previously generated, a new NFR be added to the second container file.

6. The method of claim 5, the method further comprising:
determining in a second determination, for the second container file, a third NFR be removed from the second container file.

7. The method of claim 6 further comprising:
based on the first determination and the second determination, re-generating the second container file wherein the regenerated second container file includes the new NFR and does not include the third NFR.

8. The method of claim 1, wherein each NFR is associated with at least one application in the codebase.

9. The method of claim 1, wherein the first container file is generated from a container file template.

10. A system comprising:
a processor; and
a computer-readable storage medium communicatively coupled to the processor and storing program instructions which, when executed by the processor, are configured to cause the processor to:
train a learning model with a set of training data, wherein the training data includes an application codebase, associated application functionalities, application usage statistics, application maintenance, application logs, and application trouble tickets, wherein the training is configured train the learning model to associate relevant non-relevant parameters to an application functionality;
analyze, by the learning model, a codebase, wherein the codebase includes code for one or more applications;
automatically identify, by the learning model and based on the analyzing, a set of functional requirements for each application and a set of non-functional requirements parameters (NFR), wherein each requirement of the set of functional requirements is required to complete a task associated with each application, and the set of NFR's perform functions outside of the task;
classify a first application of the one or more applications with a first NFR of the set of NFRs;
generate a recommendation to include the first NFR in a first container file for the first application;
automatically generate, by the learning model and based on the recommendation, the first container file for the first application, wherein the first container file includes the functional requirements for the first application and the first NFR; and
create a first container from the first container file.

11. The system of claim 10, wherein the first NFR is associated with a second application in the codebase.

12. The system of claim 11, wherein the first application is associated with a second NFR in the codebase and the second NFR is not included in the first container file.

13. The system of claim 10, wherein the program instruction are further configure to cause the processor to:
identify, based on the analyzing, a task that is accomplished by each application in the codebase.

14. A computer program product, the computer program product comprising a computer readable storage medium having program instructions embodied therewith, the program instructions executable by a processing unit to cause the processing unit to:
train a learning model with a set of training data, wherein the training data includes an application codebase, associated application functionalities, application usage statistics, application maintenance, application logs, and application trouble tickets, wherein the training is configured train the learning model to associate relevant non-relevant parameters to an application functionality;
analyze, by the learning model, a codebase, wherein the codebase includes code for one or more applications;
automatically identify, by the learning model and based on the analyzing, a set of functional requirements for each application and a set of non-functional requirements parameters (NFR), wherein each requirement of the set of functional requirements is required to complete a task associated with each application, and the set of NFR's perform functions outside of the task;
classify a first application of the one or more applications with a first NFR;
generate a recommendation to include the first NFR in a first container file for the first application;
automatically generate, by the learning model and based on the recommendation, the first container file for the first application, wherein the first container file includes the functional requirements for the first application and the first NFR; and
create a first container from the first container file.

15. The computer program product of claim 14, wherein the first NFR is associated with a second application in the codebase.

16. The computer program product of claim 15, wherein the first application is associated with a second NFR in the codebase and the second NFR is not included in the first container file.

17. The computer program product of claim 14, wherein the program instruction are further configure to cause the processing unit to:
identify, based on the analyzing, a task that is accomplished by each application in the codebase.

* * * * *